United States Patent [19]
Murakami et al.

[11] 3,859,277
[45] Jan. 7, 1975

[54] D-1-1-(β-CHLOROETHYL)-3-(2-OXO-3-HEXAHYDROAZEPINYL)-1-NITROSOUREA

[75] Inventors: Masuo Murakami; Kaichiro Ichikawa, both of Tokyo; Kazuo Imai, Omiya; Norio Sato, Shiraoka-machi; Noriki Ito, Ageo; Yoshihiko Oka, Kawagoe; Tsutomu Kawamura; Teruaki Ozasa, both of Ageo, all of Japan

[73] Assignee: Yamanouchi Pharmaceutical Co. Ltd., Tokyo, Japan

[22] Filed: Dec. 29, 1972

[21] Appl. No.: 319,337

Related U.S. Application Data

[63] Continuation-in-part of Ser. No. 264,858, June 21, 1972, abandoned.

[30] Foreign Application Priority Data
June 28, 1971   Japan.................. 46-46955
Apr. 27, 1972   Japan.................. 47-42496

[52] U.S. Cl..................260/239.3 R, 260/293.86, 260/326.5 FL, 260/326.45, 260/553 R, 424/244, 424/267, 424/274
[51] Int. Cl............................................. C07d 53/06
[58] Field of Search.... 260/239.3 R, 293.86, 326.45

[56] References Cited
OTHER PUBLICATIONS
Johnston et al., "J. Med. Chem.," Vol. 9, No. 6, pp. 892–911, (1966).

Advances in Cancer Research, Vol. 16, (Academic Press), (1972), pp. 273–333.

*Primary Examiner*—Henry R. Jiles
*Assistant Examiner*—Robert T. Bond

[57]         ABSTRACT

Novel nitrosourea derivatives represented by the formula

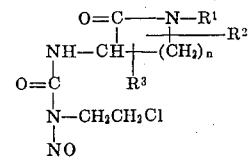

wherein $R^1$ is a hydrogen atom or a nitroso group, $R^2$ and $R^3$, which may be the same or different, each represents a hydrogen atom, a lower alkyl group, a cycloalkyl group or a lower alkoxy group and $n$ is an integer of 2–10. These derivatives are effective in treating leukaemia and other tumors.

1 Claim, No Drawings

D-1-1-(β-CHLOROETHYL)-3-(2-OXO-3-HEXAHYDROAZEPINYL)-1-NITROSOUREA

This application is a continuation-in-part of copending application Ser. No. 264,858, filed June 21, 1972 and now abandoned.

DISCLOSURE OF THE INVENTION

The present invention relates to a novel nitrosourea derivative and more particularly, it relates to a nitrosourea derivative represented by the formula (II)

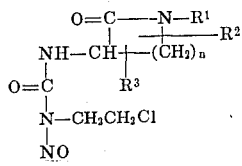

wherein $R^1$ represents a hydrogen atom or a nitroso group, $R^2$ and $R^3$, which may be the same or different, each represents a hydrogen atom, a lower alkyl group, a cycloalkyl group or a lower alkoxy group and $n$ is an integer of 2–10.

The compounds of this invention represented by the formula (II) have been confirmed to be effective in treating leukaemia and other tumours by animal tests and thus are expected to be useful as antitumour agents.

In the compound (II) of this invention, $n$ is an integer of 2–10 and examples of the rings to be formed include a 2-oxopyrrolidine ring ($n = 2$), a 2-oxopiperidine ring ($n = 3$), a 2-oxohexahydroazepine ring ($n = 4$), a 2-oxooctahydroazocine ring ($n = 5$), a 2-oxoazacyclononane ring ($n = 6$), a 2-oxoazacyclodecane ring ($n = 7$), a 2-oxoazacycloundecane ring ($n = 8$), a 2-oxoazacyclododecane ring ($n = 9$), and a 2-oxoazacyclotridecane ring ($n = 10$).

Also, $R^1$ represents a hydrogen atom or a nitroso group and $R^2$ and $R^3$, which may be the same or different, each represents a hydrogen atom, a lower alkyl group, a cycloalkyl group, or a lower alkoxy group. Examples of the lower alkyl group include a methyl group, an ethyl group, an iso-propyl group, a tert-butyl group, and an amyl group, examples of the cycloalkyl group include a cyclopentyl group and a cyclohexyl group, and examples of the lower alkoxy group include a methoxy group, an ethoxy group, a butoxy group, and an amyloxy group.

It has long been known that nitrosourea derivatives have a strong inhibition action against experimental malignant animal neoplasms and in particular, 1,3-bis(β-chloroethyl)-1-nitroso urea is famous but since such compounds are toxic, they have not yet been sold or marketed. To avoid such objections to 1,3-bis(β-chloroethyl)-1-nitroso urea, the modifications of the structure thereof have been made. For example, 3-cyclohexyl-1-(β-chloroethyl)-1-nitroso urea and 3-(4-methylcyclohexyl)-1-(β-chloroethyl)-1-nitroso urea were synthesized but satisfactory results have not yet been obtained by using these compounds (J. Med. Chem., 9, 892-911(1966)).

Various investigations of obtaining nitrosourea derivatives having considerably less toxicity as compared with that of known compounds described above and as the results thereof, it has been discovered that the compound of this invention represented by the formula (II) derived from the α-amino-ω-lactam of α, ω-diaminocarboxylic acid have low toxicity and strong antitumour activity as compared with those known compounds by animal tests.

The compounds of this invention having the formula (II) may be prepared by nitrosating the urea derivatives represented by the formula (I)

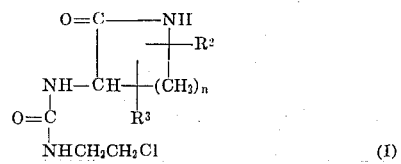

wherein $R^2$, $R^3$ and $n$ are as described above.

The nitrosation is conducted in an ordinary way, for example, is conducted by reacting a compound of the formula (I) with an equimolar or an excessive molar amount of nitrous acid. As the solvent for the reaction, formic acid, glacial acetic acid, hydrochloric acid or a diluted solution thereof with water is usually used. The reaction is conducted under cooling, preferably at 0°–5°C. The nitrous acid employed in the above reaction may be generated, ordinarily, in the reaction system, for example it is formed by the reaction of an alkali metal salt thereof such as sodium nitrite or an aqueous solution thereof with an organic acid such as formic acid, acetic acid, etc., or an inorganic acid such as hydrochloric acid, sulfuric acid, etc., which is used as the solvent for the reaction.

Moreover, the nitrosation may also be carried out by reacting the compound of the starting formula (I) with nitrosyl chloride (NOCl) in at least one of acetic acid, acetic anhydride, and pyridine; or by reacting said compound with nitrogen trioxide ($N_2O_3$) or dinitrogen tetroxide ($N_2O_4$) in acetic acid in the presence of sodium acetate; or by reacting the compound with t-butyl nitrite (t-BuONO) or t-amyl nitrite (t-AmONO) in hydrochloric acid; or by reacting the compound with formyl nitrite in 100% formic acid.

In addition, in such a reaction the compound having a nitroso group at the 3-position, represented by the formula

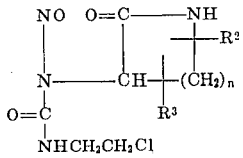

is occasionally produced as a by-product.

The desired compound (II) of this invention having a nitroso group at the 1-position were obtained by allowing to stand for a long period of time the compound of the above formula having a nitroso group at the 3-position under anhydrous condition in the presence of acid such as formic acid, acetic acid, etc.

When an excessive amount of a nitrosating agent such as nitrosyl chloride is used, the di-nitroso compound represented by the formula

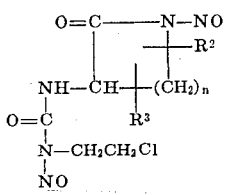

wherein $R^2$, $R^3$ and $n$ have the same significance as above, can be obtained.

The compounds of this invention shown by the formula (II) thus prepared can be isolated and purified by ordinary chemical procedures such as extraction, recrystallization, column chromatography, etc.

The compounds of this invention represented by the formula (II) includes the dl-form and the optically active optical isomers of d-form and l-form. When an optically active starting material is used, the optically active aimed compound is obtained. When the dl-form is used as the starting material, the product may be subjected to an optical resolution.

Practical examples of the compounds of this invention are 1-($\beta$-chloroethyl)-3-(2-oxo-3-pyrrolidinyl)-1-nitroso urea, 1-($\beta$-chloroethyl)-3-(2-oxo-3-piperidinyl)-1-nitroso urea, 1-($\beta$-chloroethyl)-3-(2-oxo-N-nitroso-3-piperidinyl)-1-nitroso urea, 1-($\beta$-chloroethyl)-3-(2-oxo-3-hexahydro azepinyl)-1-nitroso urea, 1-($\beta$-chloroethyl)-3-(2-oxooctahydroazocin-3-yl)-1-nitroso urea, 1-($\beta$-chloroethyl)-3-(2-oxoazacyclononan-3-yl)-1-nitroso urea, 1-($\beta$-chloroethyl)-3-(2-oxoazacyclodecan-3-yl)-1-nitroso urea, 1-($\beta$-chloroethyl)-3-(2-oxoazacycloundecan-3-yl)-1-nitroso urea, 1-($\beta$-chloroethyl)-3-(2-oxoazacyclododecan-3-yl)-1-nitroso urea, 1-($\beta$-chloroethyl)-3-(2-oxoazacyclotridecan-3-yl)-1-nitroso urea, 1-($\beta$-chloroethyl)-3-(6-methyl-2-oxo-3-piperidinyl)-1-nitroso urea, 1-($\beta$-chloroethyl)-3-(5-methyl-2-oxo-3-azepinyl)-1-nitroso urea, 1-($\beta$-chloroethyl)-3-(7-methyl-2-oxo-3-hexahydro azepinyl)-1-nitroso urea, 1-($\beta$-chloroethyl)-3-(7-buthyl-2-oxo-3-hexahydro azepinyl)1-nitroso urea, 1-($\beta$-chloroethyl)-3-(5,7-dimethyl-2-oxo-3-hexahydro azepinyl)-1-nitroso urea, 1-($\beta$-chloroethyl)-3-(5,5-dimethyl-2-oxo-3-hexahydro azepinyl)-1-nitroso urea, 1-($\beta$-chloroethyl)-3-(5-cyclohexyl-2-oxo-3-azepinyl)-1-nitroso urea, 1-($\beta$-chloroethyl)-3-(5-methoxy-2-oxo-3-hexahydro azepinyl)-1-nitroso urea, 1-($\beta$-chloroethyl)-3-(8-methyl-2-oxooctahydroazocin-3-yl)-1-nitroso urea, and 1-($\beta$-chloroethyl)-3-(8,8-dimethyl-2-oxooctahydroazocin-3-yl)1-nitroso urea.

In addition, the starting materials of the formula (I) used in this invention are a novel compound and may be prepared by the reaction of the $\alpha$-amino-$\omega$-lactam of $\alpha,\omega$-diaminocarboxylic acid, such as $\alpha,\gamma$-diaminobutyric acid, ornithine, lysin etc., with $\beta$-chloroethyl isocyanate.

The compound of this invention may be administered orally as tablets, capsules, etc., or parenterally as the form of an intravenous injection, etc. The clinical dose in the compound to an adult is 0.3—5 mg/Kg in the case of oral administration and 0.2—4 mg/Kg in the case of parenteral administration. The dose thereof is properly adjusted according to the conditions of the patients and the age thereof.

Now, the antitumour activity and the low toxicity of the compounds of this invention will be illustrated in the following Experiments I, II and III, IV, V, VI and VII wherein they were compared with those of known 1,3-bis($\beta$-chloroethyl)-1-nitroso urea and 1-($\beta$-chloroethyl)-3-(4-methylcyclohexyl)-1-nitroso urea.

EXPERIMENT I (Crocker sarcoma 180)

Small pieces of the tumour tissue, measuring approximatly 1.5 $mm^3$ were implanted subcutaneously into the right axillary region of ddN mice [male, 18–22g]. Ten mice made up each group. 24 hours after implantation, the compounds (dissolved in 2% ethanol of 0.005 N acetic acid except the marked (*) compounds) were injected intraperitoneally once daily for 5 days. Survivors of mice on the 70th day after implantation are shown in table I.

Table I

| Compound | Dose (mg/Kg × day) | Survivors |
|---|---|---|
| (Control) | | 0/10 |
| 1,3-bis($\beta$-chloroethyl)-1-nitroso urea | 10 × 5 | 4/10 |
| 1-($\beta$-chloroethyl)-3-(4-methylcyclohexyl)-1-nitrose urea* | 10 × 5 | 5/10 |
| L-1-($\beta$-chloroethyl)-3-(2-oxo-3-azepinyl hexahydro)-1-nitroso urea | 10 × 5 | 8/10 |
| D-1-($\beta$-chloroethyl)-3-(2-oxo-3-azepinyl hexahydro)-1-nitroso urea | 10 × 5 | 8/10 |
| DL-1-($\beta$-chloroethyl)-3-(2-oxo-3-azepinyl hexahydro)-1-nitroso urea | 10 × 5 | 8/10 |
| DL-1-($\beta$-chloroethyl)-3-(2-oxoazacyclodecan-3-yl)-1-nitroso urea* | 10 × 5 | 8/10 |

EXPERIMENT II (Crocker sarcoma 180)

Implantation of the tumour and injection of the compounds are carried out as above. The results of the ex- Table II

| Compound | Dose (mg/Kg × day) | Result at end of 2nd week Number of deaths | Tumour Index | Result at end of 3rd week Number of deaths | Tumour Index |
|---|---|---|---|---|---|
| 1,3-bis(β-chloroethyl)-1-nitroso urea | 10 × 5 | 1/10 | 1.85 | 2/10 | 0.94 |
| do. | 10 × 10 | 0/10 | 1.06 | 3/10 | 0.46 |
| 1-(β-chloroethyl)-3-(4-methylcyclohexyl)-1-nitroso urea * | 10 × 5 | 0/10 | 0.30 | 3/10 | 0 |
| L-1-(β-chloroethyl)-3-(2-oxo-3-hexahydro azepinyl)-1-nitroso urea | 10 × 5 | 0/10 | 0.16 | 0/10 | 0 |
| do. | 10 × 10 | 0/10 | 0.15 | 2/10 | 0 |
| D-1-(β-chloroethyl)-3-(2-oxo-3-hexahydro azepinyl)-1-nitroso urea | 10 × 5 | 0/10 | 0.24 | 0/10 | 0.34 |
| DL-1-(β-chloroethyl)-3-(2-oxo-3-hexahydro azepinyl)-1-nitroso urea | 10 × 5 | 0/10 | 0.30 | 0/10 | 0.11 |
| DL-1-(β-chloroethyl)-3-(2-oxooctahydroazocin-3-yl)-1-nitroso urea * | 10 × 5 | 0/10 | 0.29 | 1/10 | 0.37 |
| DL-1-(β-chloroethyl)-3-(2-oxoazacyclononan-3-yl)-1-nitroso urea * | 10 × 5 | 0/10 | 0.30 | 0/10 | 0 |
| DL-1-(β-chloroethyl)-3-(2-oxoazacyclodecan-3-yl)-1-nitroso urea * | 10 × 5 | 0/10 | 0.15 | 1/10 | 0 | periment were shown in table II. At the end of the second and third week after implantation, the numbers of dead mice are counted and tumour diameters were measured along two perpendicular axes with a caliper. Tumour size was calculated using the formula $a \times b$, where $a$ and $b$ are the major and minor diameter respectively.

The tumour index (%) was calculated using the formula.

$$T/C \times 100$$

C: the average control-tumour size
T: the average treated-tumour size

EXPERIMENT III (Leukemia L-1210)

Cells of Leukemia L-1210 ($1=10^6$) were implanted intraperitoneally into $CDF_1$ mice [female, 18–22g]. Ten mice made up each group. The test conditions were the same as above except the number of administration lasted 10 days (once daily in the course of 11 days). The survival time (in days) of each animal was noted for 65 days after implantation and the increases in life span (ILS) of the experimental groups were calculated using the following formula excluding the 65 day survivors.

$$ILS = (T/C - 1) \times 100$$

C: the median survival day of the control group
T: the median survival day of the treated group

EXPERIMENT IV (Crocker sarcoma 180)

Implantation of the tumour and injection of the compounds were carried out as in Experiment I. The test conditions were the same as Experiment I except for the number of administration which was once. Survivors of mice on the 30th day after implantation were shown in Table IV.

Table IV

| Compound | Dose (mg/Kg) | Survivors |
|---|---|---|
| (control) | none | 0/10 |
| DL-1-(β-chloroethyl)-3-(2-oxo-3-piperidinyl)-1-nitroso urea | 7.7 | 8/10 |
|  | 10 | 10/10 |
|  | 13 | 10/10 |
|  | 16.9 | 10/10 |
|  | 22 | 10/10 |
|  | 28.6 | 9/10 |
| DL-1-(β-chloroethyl)-3-(2-oxo-3-hexahydro azepinyl)-1-nitroso urea | 10 | 5/10 |
|  | 13 | 9/10 |
|  | 16.9 | 10/10 |
|  | 22 | 10/10 |
|  | 28.6 | 9/10 |
|  | 37.2 | 10/10 |
| DL-1-(β-chloroethyl)-3-(2-oxooctahydroazocin-3-yl)-1-nitroso urea * | 10 | 6/10 |
|  | 13 | 8/10 |
|  | 16.9 | 9/10 |
|  | 22 | 7/10 |
|  | 28.6 | 9/10 |
| DL-1-(β-chloroethyl)-3-(2-oxoazacyclononan-3-yl)-1-nitroso urea * | 10 | 5/10 |
|  | 13 | 10/10 |
|  | 16.9 | 10/10 |
|  | 22 | 8/10 |
|  | 28.6 | 5/10 |
|  | 37.2 | 0/10 |
| DL-1-(β-chloroethyl)- | 10 | 3/10 |

Table III

| Compound | Dose (mg/Kg × day) | % ILS | Survivors |
|---|---|---|---|
| 1,3-bis(β-chloroethyl)-1-nitroso urea | 10 × 10 | +180 | 1/10 |
| do. | 10 × 10 | +225 | 4/10 |
| 1-(β-chloroethyl)-3-(4-methylcyclohexyl)-1-nitroso urea* | 10 × 10 | +286 | 4/10 |
| L-1-(β-chloroethyl)-3-(2-oxo-3-azepinyl)-1-nitroso urea | 10 × 10 | +340 | 7/10 |
| D-1-(β-chloroethyl)-3-(2-oxo-3-hexahydro azepinyl)-1-nitroso urea | 10 × 10 | +407 | 4/10 |
| DL-1-(β-chloroethyl)-3-(2-oxoocta-hydroazocin-3-yl)-1-nitroso urea * | 10 × 10 | +273 | 5/10 |
| DL-1-(β-chloroethyl-3-(2-oxo-3-hexahydro azepinyl)-1-nitroso urea | 10 × 10 | +347 | 8/10 |
| DL-1-(β-chloroethyl)-3-(2-oxoazacyclo-nonan-3-yl)-1-nitroso urea * | 10 × 10 | +314 | 7/10 |

Table IV-Continued

| Compound | Dose (mg/Kg) | Survivors |
|---|---|---|
| 3-(2-oxoazacyclodecan-3-yl)-1-nitroso urea * | 13 | 8/10 |
|  | 16.9 | 6/10 |
|  | 22 | 9/10 |
|  | 28.6 | 9/10 |
|  | 37.2 | 5/10 |
| 1,3-bis($\beta$-chloroethyl)-1-nitroso urea | 10 | 1/10 |
|  | 13 | 3/10 |
|  | 16.9 | 6/10 |
|  | 22 | 7/10 |
|  | 28.6 | 8/10 |
|  | 37.2 | 9/10 |

EXPERIMENT V (Crocker sarcoma 180)

Implantation of the tumour and injection of the compounds were carried out as in Experiment I. The results of the experiment are shown in Table V. At the end of the second week after implantation, number of dead mice were counted and tumour diameters were calculated using the formula $a \times b$, where $a$ and $b$ are the major and minor diameters respectively.

The tumour index (%) was calculated using the formula.

$$T/C \times 100$$

C: the average control-tumour size
T: the average treated-tumour size

The results of treatment in the table were determined by the following table according to the K. Sugiura's method (Cancer Research, 27 (2), 179 (1967)):

| Symbol | Degree of tumour inhibition | Tumour index (%) |
|---|---|---|
| − | none | 76–100 |
| ± | slight | 51–75 |
| + | moderate | 26–50 |
| ++ | marked | 8–25 |
| +++ | complete | 0–7 |

EXPERIMENT VI (Leukemia L-1210)

Cells of Leukemia L-1210 ($1 \times 10^6$) were implanted intraperitoneally into $CDF_1$ mice [female, 18–22 g]. Ten mice made up each group. The test conditions were the same as in Experiment III. The survival time (in days) of each animal was noted for 30 days after implantation and increases in life span (ILS) of the experimental groups were calculated using the following formula excluding 30 day survivors.

$$ILS = (I/C - 1) \times 100$$

C: the median survival day of the control group
T: the median survival day of the treated group

Table VI

| Compound | Dose (mg/Kg) | % ILS | Survivors |
|---|---|---|---|
| DL-1-($\beta$-chloroethyl)-3-(2-oxo-3-piperidinyl)-1-nitroso urea | 11.5 | +143 | 3/10 |
|  | 15.0 | +136 | 8/10 |
|  | 19.5 | − | 10/10 |
|  | 25.4 | +200 | 5/10 |
|  | 33.0 | +129 | 1/10 |
| DL-1-($\beta$-chloroethyl)-3-(2-oxo-3-hexahydroazepinyl)-1-nitroso urea | 15.0 | +100 | 3/10 |
|  | 19.5 | +163 | 5/10 |
|  | 25.4 | − | 10/10 |
|  | 33.0 | − | 10/10 |

Table V

| Compound | Dose (mg/Kg) | Tumor Index | Result of treatment | Number of deaths |
|---|---|---|---|---|
| DL-1($\beta$-chloroethyl)-3-(2-oxo-3-piperidinyl)-1-nitroso urea | 7.7 | 7.33 | +++ | 0/10 |
|  | 10 | 0.15 | +++ | 0/10 |
|  | 13 | 0.23 | +++ | 0/10 |
|  | 16.9 | 0.55 | +++ | 0/10 |
|  | 22 | 0.31 | +++ | 0/10 |
|  | 28.6 | 0.23 | +++ | 0/10 |
| DL-1-($\beta$-chloroethyl)-3-(2-oxo-3-hexahydioazepinyl)-1-nitroso urea | 10 | 20.23 | ++ | 0/10 |
|  | 13 | 1.24 | +++ | 0/10 |
|  | 16.9 | 1.05 | +++ | 0/10 |
|  | 22 | 0.67 | +++ | 0/10 |
|  | 28.6 | 0.76 | +++ | 0/10 |
|  | 37.2 | 0.38 | +++ | 0/10 |
| DL-1-($\alpha$-chloroethyl)-3-(2-oxooctahydroazocin-3-yl)-1-nitroso urea * | 7.7 | 27.77 | + | 0/10 |
|  | 10 | 9.73 | ++ | 0/10 |
|  | 13 | 0.93 | +++ | 0/10 |
|  | 16.9 | 0.68 | +++ | 0/10 |
|  | 22 | 1.06 | +++ | 2/10 |
|  | 28.6 | 0.49 | +++ | 1/10 |
| DL-1-($\beta$-chloroethyl)-3-(2-oxoazacyclononan-3-yl)-1-nitroso urea * | 10 | 2.46 | +++ | 0/10 |
|  | 13 | 0.68 | +++ | 0/10 |
|  | 16.9 | 0.68 | +++ | 0/10 |
|  | 22 | 0.89 | +++ | 0/10 |
|  | 28.6 | 0.82 | +++ | 1/10 |
| DL-1-($\beta$Chloroethyl)-3-(2-oxoazacyclodecan-3-yl)-1-nitroso urea * | 10 | 32.43 | + | 0/10 |
|  | 13 | 7.02 | +++ | 1/10 |
|  | 16.9 | 17.35 | ++ | 0/10 |
|  | 22 | 6.4 | +++ | 0/10 |
|  | 28.6 | 1.44 | +++ | 0/10 |
|  | 37.2 | 1.44 | +++ | 1/10 |
| 1,3-bis($\beta$-chloroethyl)-1-nitroso urea | 10 | 61.11 | ± | 0/10 |
|  | 13 | 56.21 | ± | 0/10 |
|  | 16.9 | 15.67 | ++ | 0/10 |
|  | 22 | 9.36 | ++ | 1/10 |
|  | 28.6 | 1.57 | +++ | 0/10 |
|  | 37.2 | 1.82 | +++ | 0/10 |

Table VI-Continued

| Compound | Dose (mg/Kg) | % ILS | Survivors |
|---|---|---|---|
|  | 42.9 | +144 | 8/10 |
| DL-1-($\beta$-chloroethyl)-3- | 11.5 | +143 | 2/10 |
| (2-oxooctahydroazocin- | 15.0 | +143 | 3/10 |
| 3-yl)-1-nitroso urea * | 19.5 | +114 | 5/10 |
|  | 25.4 | +229 | 9/10 |
|  | 33.0 | +243 | 7/10 |
|  | 42.9 | +71 | 2/10 |
| DL-1-($\beta$-chloroethyl)-3- | 15.0 | +186 | 3/10 |
| (2-oxoazacyclononan- | 19.5 | +229 | 9/10 |
| 3-yl)-1-nitroso urea * | 25.4 |  | 10/10 |
|  | 33.0 | +86 | 9/10 |
|  | 42.9 | +36 | 4/10 |
| DL-1-($\beta$-chloroethyl)-3- | 15.0 | +86 | 0/10 |
| (2-oxoazacyclodecan- | 19.5 | +186 | 1/10 |
| 3-yl)-1-nitroso urea * | 25.4 | +157 | 1/10 |
|  | 33.0 | +157 | 9/10 |
|  | 42.9 | — | 10/10 |
| 1,3-bis($\beta$-chloroethyl)-1- | 15.0 | +114 | 0/10 |
| nitroso urea | 19.5 | +179 | 4/10 |
|  | 25.4 | — | 10/10 |
|  | 33.0 | +200 | 8/10 |
|  | 42.9 | — | 10/10 |

EXPERIMENT VII

An aqueous 2% ethanol-0.005 N acetic acid solution of the sample was administered by subcutaneous injection only once to Donryu rats [male, 110–130 g]. and ddN mice [male, 19–22 g.], each group 10 rats or mice. By observing the number of dead rats and mice after 60 days since the administration of the sample, $LD_{10}$ was obtained. The results are shown in Table VII.

Table VII

| Compound | ddN mice $LD_{10}$ (mg/Kg) | Donryu rats $LD_{10}$ (mg/Kg) |
|---|---|---|
| 1,3-bis($\beta$-chloroethyl)-1-nitroso urea | 23.9 | 17.7 |
| 1-($\beta$-chloroethyl)-3-(4-methyl-cyclohexyl)-1-nitroso urea* | 24.0 | — |
| DL-1-($\beta$-chloroethyl)-3-(2-oxo-3-hexahydrozepinyl)-1-nitroso urea | 26.1 | 32.4 |
| L-1-($\beta$-chloroethyl)-3-(2-oxo-3-hexahydroazepinyl)-1-nitroso urea | 33.2 | 46.3 |
| DL-1-($\beta$-chloroethyl)-3-(2-oxo-octahydroazocin-3-yl)-1-nitroso urea* | 26.6 | 26.7 |
| DL-1-($\beta$-chloroethyl)-3-(2-oxo-azacyclononan-3-yl)-1-nitroso urea* | 28.2 | 24.6 |
| DL-1-($\beta$-chloroethyl)-3-(2-oxo-azacyclodecan-3-yl)-1-nitroso urea* | 32.2 | 16.1 |

As it is clear from the aforesaid Experiments I, II, III, IV, V, VI, and VII, the compounds (II) of this invention have low toxicity and strong antitumour activity as compared with the known 1,3-bis($\beta$-chloroethyl)-1-nitroso urea and 1-($\beta$-chloroethyl)-3-(4-methylcyclohexyl)-1-nitroso urea.

The present invention will now be illustrated practically in and by the following examples.

EXAMPLE 1 a. In 30 ml of chloroform was dissolved 1.28g of L-3-amino-2-oxohexahydroazepine and after adding dropwise 1.2g of $\beta$-chloroethylisocyanate to the solution with stirring at 0°–5°C, the mixture was further stirred overnight at room temperature. The precipitates thus deposited were recovered by filtration and the solvent was distilled off under reduced pressure. When water was added to the oily material obtained, crystals were precipitated, which were recovered by filtration to provide 1.5g of L-1-($\beta$-chloroethyl)-3-(2-oxo-3-hexahydro azepinyl) urea having a melting point of 167°–169°C.

| Elemental analysis as $C_9H_{16}N_3O_2Cl$: | | | |
|---|---|---|---|
|  | C(%) | H(%) | N(%) |
| Calculated: | 46.24 | 6.91 | 17.99 |
| Found: | 45.96 | 6.68 | 18.00 | b. In 20 ml of 99% formic acid was dissolved 1.16g of the L-1-($\beta$-chloroethyl)-3-(2-oxo-3-hexahydro azepinyl) urea prepared above and after adding dropwise to the solution 0.7g of sodium nitrite in 8 ml of water with stirring at 0°–5°C followed by stirring for 30 minutes, 50 ml of water was added to the mixture, whereby an oily material was formed. The oily material was extracted three time each time with 10 ml of chloroform, and the extracts were combined, washed twice each with 5 ml of water and dried over anhydrous sodium sulfate. Then, the solvent was distilled off under reduced pressure and the oily material obtained was purified by subjecting it to a silica gel column chromatography and developing with ethyl acetate as an eluate. The oily material thus purified was dissolved in ethyl acetate and then, petroleum ether was added to the solution, whereby crystals were precipitated. The crystals were recovered by filtration to provide 0.8g of L-1-($\beta$-chloroethyl)-3-(2-oxo-3-hexahydro azepinyl)-1-nitroso urea. Melting point 84°–85.5°C.

$[\alpha]_D^{25} = +61.7°$ (C = 1.934, ethanol)

| Elemental analysis as $C_9H_{15}N_4O_3Cl$: | | | |
|---|---|---|---|
|  | C(%) | H(%) | N(%) |
| Calculated: | 41.15 | 5.75 | 21.34 |
| Found: | 41.21 | 5.84 | 21.28 |

By following the same procedure as above using D-1-($\beta$-chloroethyl)-3-(2-oxo-3-hexahydro azepinyl)urea as the starting material, D-1-($\beta$-chloroethyl)-3-(2-oxo-3-hexahydro azepinyl)-1-nitroso urea was obtained.

$[\alpha]_D^{23} = -63.6°$ (C = 1.96, ethanol)

EXAMPLE 2 a. In 45 ml of chloroform was dissolved 5.12g of DL-3-amino-2-oxohexahydroazepine and while stirring the solution at 0°–5°C, a solution of 4.8g of $\beta$-chloroethyl isocyanate in 45 ml of chloroform was added dropwise to the solution under nitrogen atmosphere. After stirring the mixture for 3 hours at room temperature, the crystals thus precipitated were recovered by filtration to provide 9.0g of DL-1-($\beta$-chloroethyl)-3-(2-oxo-3-hexahydro azepinyl)urea.

The melting point of the product was 179°–181°C (180°–183°C when tetrahydrofuran was used as the solvent and 174°–178°C when the product was recrystallized from methanol-benzene).

b. In 60 ml of 99% formic acid was dissolved 3.48g of DL-1-($\beta$-chloroethyl)-3-(2-oxo-3-hexahydro azepinyl)urea and after adding dropwise to the solution a solution of 2.1g of sodium nitrite in 24 ml of water with stirring at 0°–5°C, the mixture was stirred for 30 minutes. Then, 250 ml of cold water was added to the reaction mixture and the product was extracted thrice each with 30 ml of chloroform. The extracts were combined, washed twice each with 10 ml of water, dried over anhydrous sodium sulfate, and concentrated under reduced pressure. To the residue was added a mixture of ethyl acetate and petroleum ether and then the crystals thus precipitated were recovered by filtration to provide 3.5g of DL-1-(β-chloroethyl)-3-(2-oxo-3-hexahydro azepinyl)-1-nitroso urea. When the product was recrystallized from ethanol-petroleum ether, two kinds of crystals having melting points of 100°–102°C and 108°–110°C respectively were obtained according to the change in mixing ratio of the both solvents but the two crystals coincided well each other in the Rf values by a thin-layer chromatography, the nuclear magnetic resonance spectra, and elemental analysis.

Elemental analysis as $C_9H_{15}N_4O_3Cl$:

|  | C(%) | H(%) | N(%) | Cl(%) |
|---|---|---|---|---|
| Calculated: | 41.15 | 5.75 | 21.34 | 13.52 |
| Found (a): | 41.15 | 5.76 | 21.30 | 13.50 |
| do. (b): | 41.15 | 5.74 | 21.31 | 13.50 |

(a): the crystals of the product having a melting point of 100 - 102°C
(b): the crystals of the product having a melting point of 108 - 110°C

EXAMPLE 3 a-1. L-3-amino-2-oxohexahydroazepine L-pyrrolidonecarboxylate was prepared by the reaction of DL-3-amino-2-oxohexahydroazepine and L-pyrrolidonecarboxylic acid (Helv. Chim. Acta., 41, 181–188(1958)) and the reaction product was filtered. When the filtrate was concentrated and D-tartaric acid was added to the concentrate, D-3-amino-2-oxohexahydroazepine D-tartarate was precipitated. The yield for the product was 75% and the melting point was higher than 300°C.

$[\alpha]_D^{25} = + 26.4°$ (C = 2.5, water)
The hydrochloride of the product: $[\alpha]_D^{25} = + 26°$ (C = 3.33, 1 N HCl)
[L-3-amino-2-oxohexahydroazepine hydrochloride: $[\alpha]_D^{25} = - 24.5° \pm 1.21$ (C = 3.2, 1 N HCl): Helve. Chim. Acta., 41, 181–188(1958)].

The D-3-amino-2-oxohexahydroazepine D-tartarate was converted into the free amine using an ion-exchange resin, Amberlite IRA-410 and distilled water containing no carbon dioxide gas as the eluate under nitrogen atmosphere and then by processing the amine as in Example 1 (a), D-1-(β-chloroethyl)-3-(2-oxo-3-hexahydro azepinyl)urea was obtained.

Melting point 176°–176.5°C (recrystallized from methanol-benzene)

$[\alpha]_D^{25} = - 15.7°$ (C = 2.40, methanol)

a-2. In 20 ml of anhydrous benzene was dissolved 0.6g of L-3-amino-2-oxohexahydroazepine prepared by the same way as in (a-1) and while stirring the solution at 0°–5°C, a solution of 4.8g of β-chloroethyl isocyanate in 5 ml of anhydrous benzene was added dropwise to the solution under nitrogen atmosphere. After stirring the mixture for 1.5 hours at room temperature, the crystals thus precipitated were recovered by filtration to provide 1.1g of L-1-(β-chloroethyl)-3-(2-oxo-3-hexahydro azepinyl)urea. The product after recrystallization from methanol-benzene showed a melting point of 176°–177°C.

$[\alpha]_D^{25} = + 15.8°$ (C = 2.63, methanol)

b. In 10 ml of 99% formic acid was dissolved 0.50g. of L-1-(β-chloroethyl)-3-(2-oxo-3-hexahydro azepinyl)urea obtained in a)-2 and while stirring the solution of 0°–5°C, a solution of 0.35g of sodium nitrite in 4 ml of water was added dropwise to the solution over a period of 30 minutes. Furthermore, after stirring the mixture for 30 minutes, 40 ml of cold water was added to the mixture and the reaction product was extracted thrice each with 10 ml of chloroform. The extracts were combined, washed twice each with 5 ml of water, dried over anhydrous magnesium sulfate, and concentrated under reduced pressure. The oily material thus obtained was subjected to a silica gel column chromatography and the product was developed using ethyl acetate as the elute. By concentrating the effluent and recrystallizing the product from ethyl acetate-petroleum ether, 0.35g of L-1-(β-chloroethyl)-3-(2-oxo-3-hexahydro azepinyl)-1-nitroso urea was obtained. Melting point 92.5°–93.5° C.

$[\alpha]_D^{25} = + 69°$ (C = 2.4, ethanol)

Elemental analysis as $C_9H_{15}N_4O_3Cl$:

|  | C(%) | H(%) | N(%) | Cl(%) |
|---|---|---|---|---|
| Calculated: | 41.15 | 5.75 | 21.34 | 13.52 |
| Found: | 41.11 | 5.78 | 21.29 | 13.54 |

By following the same procedure as above using the D-1-(β-chloroethyl)-3-(2-oxo-3-hexahydro azepinyl)urea prepared in a)-1 as the starting material, D-1-(β-chloroethyl)-3-(2-oxo-3-hexahydro azepinyl)-1-nitroso urea was obtained. Melting point 91.5°–92.5°C.

$[\alpha]_D^{25} = - 70°$ (C = 2.6, ethanol)

Elemental analysis as $C_9H_{15}N_4O_3Cl$:

|  | C(%) | H(%) | N(%) | Cl(%) |
|---|---|---|---|---|
| Calculated: | 41.15 | 5.75 | 21.34 | 13.52 |
| Found: | 41.15 | 5.77 | 21.28 | 13.50 |

EXAMPLE 4 a. In 25 ml of chloroform was dissolved 1.0g of 3-amino-2-oxopyrrolidine and after adding dropwise to the solution 25 ml of chloroform containing 1.5g of β-chloroethyl isocyanate with stirring at 0°–5°C, the mixture was stirred for one hour at room temperature. The crystals thus precipitated were recovered by filtration to provide 1.8g of 1-(β-chloroethyl)-3-(2-oxo-3-pyrrolidinyl)urea. Melting point 207°–209°C.

Elemental analysis as $C_7H_{12}N_3O_2Cl$:

|  | C(%) | H(%) | N(%) |
|---|---|---|---|
| Calculated: | 40.88 | 5.88 | 20.43 |
| Found: | 40.84 | 5.85 | 20.28 | b. In 38 ml of 99% formic acid was dissolved 1.5g of 1-(β-chloroethyl)-3-(2-oxo-3-pyrrolidinyl)urea and while stirring the solution at 0°–5°C, 2.1g of sodium nitrite was added over a period of 20 minutes. After stirring further for 30 minutes, 50 ml of ice-water was added to the mixture and the product was extracted 3 times each time with 20 ml of chloroform. The extracts were combined, washed 3 times each time with 10 ml of water, dried over anhydrous sodium sulfate, and concentrated under reduced pressure. The oily residue obtained was subjected to a silica gel column chromatography and the product was developed using a mixture of ethyl acetate and chloroform (1:1 in volume ratio) as the elute. By concentrating the effluent under reduced pressure, 1g of oily 1-(β-chloroethyl)-3-(2-oxo-3-pyrrolidinyl)-1-nitroso urea was obtained. When the product was subjected to a silica gel thin-layer chromatography, the spots showing the Rf values of 0.85 and 0.45 were obtained in the cases of using a mixture of ethyl acetate and methanol (19:1 in volume ratio) and a mixture of ethyl acetate and chloroform (1:1 in volume ratio) respectively.

Elemental analysis as $C_7H_{11}N_4O_3Cl$:

|  | Cl (%) |
|---|---|
| Calculated: | 15.11 |
| Found: | 15.36 |

EXAMPLE 5 a. In 30 ml of chloroform was dissolved 3.0g of 3-amino-2-oxooctahydroazocine and after adding dropwise to the solution 18 ml of chloroform containing 1.8g of β-chloroethyl isocyanate with stirring at 0°–5°C over a period of 10 minutes, the mixture was stirred for 15 minutes at the same temperature as above. After the reaction was over, the chloroform solution was washed with 10 ml of water and dried over anhydrous sodium sulfate. The chloroform solution was concentrated under reduced pressure and then n-hexane was added to the residue, whereby crystals were formed. The crystals were recovered by filtration and recrystallized from a mixture of chloroform and n-hexane (1:5 in volume ratio) to provide 2.3g of 1-(β-chloroethyl)-3-(2-oxooctahydroazocin-3-yl)urea. Melting point 170°–173°C.

Elemental analysis as $C_{10}H_{18}N_3O_2Cl$:

|  | C(%) | H(%) | N(%) | Cl(%) |
|---|---|---|---|---|
| Calculated: | 48.49 | 7.32 | 16.96 | 14.31 |
| Found: | 48.20 | 7.24 | 16.62 | 14.25 | b. In 15 ml of 99% formic acid was dissolved 0.75g of 1-(β-chloroethyl)-3-(2-oxooctahydroazocin-3-yl)-urea at 10°C and after adding dropwise a solution of 0.5g of sodium nitrite in 6 ml of water to the solution, the mixture was stirred for 5 minutes at 10°–12°C. Then, 60 ml of ice water was added to the reaction mixture and the product was extracted 3 times each time with 10 ml of chloroform. The extracts were combined, washed twice each with 10 ml of water, dried over anhydrous sodium sulfate, and concentrated under reduced pressure. When the oily material obtained was dissolved in a small amount of acetone and petroleum ether was added to the solution, crystals were formed. The crystals were recovered by filtration and recrystallized from a mixture of acetone and petroleum ether (11:5 in volume ratio) to provide 0.7g of 1-(β-chloroethyl)-3-(2-oxooctahydroazocin-3-yl)-1-nitroso urea having a melting point of 102°–103°C.

Elemental analysis as $C_{10}H_{17}N_4O_3Cl$:

|  | C(%) | H(%) | N(%) | Cl(%) |
|---|---|---|---|---|
| Calculated: | 43.40 | 6.19 | 20.25 | 12.81 |
| Found: | 43.72 | 5.85 | 21.14 | 12.77 |

EXAMPLE 6 a. In 12 ml of anhydrous chloroform was dissolved 650 mg of 3-amino-2-oxoazacyclotridecane and while stirring the solution at 0°–5°C under a nitrogen atmosphere, a solution of 338 mg of β-chloroethyl isocyanate in 6 ml of anhydrous chloroform was added dropwise to the solution over a period of 10 minutes and thereafter, the mixture was stirred for one hour at 7°–8°C. The crystals thus formed were recovered by filtration to provide 500 mg of 1-(β-chloroethyl)-3-(2-oxoazacyclotridecan-3-yl)urea. By concentrating the filtrate under reduced pressure, 250 mg of the crystals of the product were further obtained. Melting point 226°–228°C.

Elemental analysis as $C_{15}H_{28}N_3O_2Cl$:

|  | C(%) | H(%) | N(%) | Cl(%) |
|---|---|---|---|---|
| Calculated: | 56.68 | 8.88 | 13.22 | 11.15 |
| Found: | 56.67 | 8.75 | 12.92 | 11.30 | b. In 15 ml of 99% formic acid was dissolved 500 mg of 1-(β-chloroethyl)-3-(2-oxoazacyclotridecan-3-yl)urea and while stirring the solution at 10°C, a solution of 0.25g of sodium nitrite in 3 ml of water was added dropwise to the solution. After stirring the mixture for a further 15 minute period at the same temperature as above, the mixture was dispersed in 100 ml of water and the crystals thus deposited were recovered to provide 500 mg of 1-(β-chloroethyl)-3-(2-oxoazacyclotridecan-3-yl)-1-nitroso urea. The product after recrystallization from a mixture of chloroform and hexane (5:1 in volume ratio) showed a melting point of 136°–138°C.

Elemental analysis as $C_{15}H_{27}N_4O_3Cl$:

|  | C(%) | H(%) | N(%) | Cl(%) |
|---|---|---|---|---|
| Calculated: | 51.94 | 7.85 | 16.15 | 10.22 |
| Found: | 52.10 | 7.83 | 16.39 | 10.33 |

EXAMPLE 7

In a mixture of 4 ml of acetic acid and 2 ml of acetic anhydride was dissolved 110 mg of 1-(β-chloroethyl)-3-(2-oxo-3-piperidinyl)urea and while stirring the solution under ice-cooling, a solution of 230 mg of nitrosyl chloride in 1 ml of acetic anhydride was added dropwise. After stirring the mixture for 15 minutes, ice-water was added to the reaction mixture and the product was extracted with chloroform. When the extract was washed with ice-water, dried over anhydrous magnesium sulfate, and concentrated under reduced pressure at room temperature, a faint yellow crystals were precipitated. The crystals were recovered by filtration and washed with a mixture of ether and petroleum ether (1:1 in volume ratio) to provide 98 mg of the yellow crystals of 1-(β-chloroethyl)-3-(2-oxo-N-nitroso-3-piperidinyl)-1-nitroso urea. Melting point 136°C (decomposed).

Elemental analysis as $C_8H_{12}N_5O_4Cl$:

|  | C(%) | H(%) | N(%) |
|---|---|---|---|
| Calculated: | 34.61 | 4.36 | 25.22 |
| Found: | 34.43 | 4.51 | 25.46 |

EXAMPLE 8 a. In 30 ml of chloroform was dissolved 0.9g of 3-amino-2-oxoazacyclononane and after adding dropwise to the solution a solution of 0.8g of β-chloroethyl isocyanate in 20 ml of chloroform with stirring at 0°–5°C over a period of 15 minutes and thereafter, the mixture was stirred for 20 minutes at the same temperature as above. The crystals thus formed were recovered by filtration to provide 1.2g of 1-(β-chloroethyl)-3-(2-oxoazacyclononan-3-yl)urea. Melting point 186°–188°C.

Elemental analysis as $C_{11}H_{20}N_3O_2Cl$:

|  | C(%) | H(%) | N(%) |
|---|---|---|---|
| Calculated: | 50.48 | 7.70 | 16.05 |
| Found: | 50.23 | 7.59 | 16.26 | b. In 10 ml of 99% formic acid was dissolved 0.3g of 1-(β-chloroethyl)-3-(2-oxoazacyclononan-3-yl)urea and while stirring the solution at 0°–5°C, 0.32g of sodium nitrite was added to the solution over a period of 15 minutes. After the mixture was stirred further for 30 minutes, 10 ml of ice-water was added to the reaction mixture and then the product was extracted 3 times each time with 10 ml of chloroform. The extracts were combined, washed 3 times each time with 5 ml of water, dried over anhydrous sodium sulfate, and concentrated under reduced pressure. The oily material thus obtained was dissolved in ether and then n-hexane was added to the solution, whereby crystals were precipitated. The crystals were recovered by filtration and recrystallized from a mixture of acetone and n-hexane (2:1 in volume ratio) to provide 0.15g of 1-(β-chloroethyl)-3-(2-oxoazacyclononan-3-yl)-1-nitroso urea. Melting point 146°–147°C.

Elemental analysis as $C_{11}H_{19}N_4O_3Cl$:

|  | C(%) | H(%) | N(%) |
|---|---|---|---|
| Calculated: | 45.44 | 6.59 | 19.27 |
| Found: | 45.32 | 6.72 | 19.45 |

EXAMPLE 9 a. In 10 ml of anhydrous chloroform was dissolved 350 mg of 3-amino-2-oxoazacyclodecane and the mixture was cooled to 0°–5°C. Then, while stirring the solution at 0°–5°C, a solution of 260 mg of β-chloroethyl isocyanate in 4 ml of chloroform was added dropwise to the solution over a period of 5 minutes and the mixture was further stirred for 1 hour at 7°–8°C. The solvent was distilled off under reduced pressure, 15 ml of benzene was added to the residue thus remained, and the crystals precipitated were recovered by filtration to provide 376 mg of 1-(β-chloroethyl)-3-(2-oxoazacyclodecan-3-yl)urea. Melting point 215°–216°C.

Elemental analysis as $C_{12}H_{22}N_3O_2Cl$:

|  | C(%) | H(%) | N(%) | Cl(%) |
|---|---|---|---|---|
| Calculated: | 52.26 | 8.04 | 15.24 | 12.86 |
| Found: | 52.23 | 8.01 | 15.19 | 12.77 | b. In 6 ml of 99% formic acid cooled at 10°C was dissolved 200 mg of 1-(β-chloroethyl)-3-(2-oxoazacyclodecan-3-yl)urea and after adding to the solution a solution of 100 mg of sodium nitrite in 1.2 ml of water over a period of 3 minutes, the mixture was stirred for 7 minutes at 10°C. Then, 40 ml of ice-water was added to the reaction mixture, the crystals formed were recovered by filtration, washed with ice-water, and recrystallized from a mixture of acetone and n-hexane (1:1 in volume ratio) to provide 166 mg of 1-(β-chloroethyl)-3-(2-oxoazacyclodecan-3-yl)-1-nitroso urea. Melting point 150°–152°C.

Elemental analysis as $C_{12}H_{21}N_4O_3Cl$:

|  | C(%) | H(%) | N(%) | Cl(%) |
|---|---|---|---|---|
| Calculated: | 47.29 | 6.95 | 18.38 | 11.63 |
| Found: | 47.18 | 6.79 | 18.34 | 11.57 |

EXAMPLE 10 a. In 20 ml. of chloroform was dissolved 621 mg. of 3-amino-2-oxoazacycloundecane and while stirring the solution in a nitrogen gas stream under cooling to temperatures of 0 to 5°C., a solution of 520 mg. of β-chloroethyl isocyanate in 8 ml. of anhydrous chloroform was added dropwise to the solution over a 5 minute period. Thereafter, the mixture was stirred for 90 minutes at room temperature. The solvent was distilled away under a reduced pressure from the product and after adding to the residue 30 ml. of benzene, the crystals thus formed were recovered by filtration to provide 525 mg. of 1-(β-chloroethyl)-3-(2-oxoazacycloundecane-3-yl)-urea having a melting point of 213°–215°C.

Elemental analysis for $C_{13}H_{24}N_3O_2Cl$:

|  | C(%) | H(%) | N(%) | Cl(%) |
|---|---|---|---|---|
| Calculated: | 53.88 | 8.35 | 14.50 | 12.23 |
| Found: | 53.61 | 8.09 | 14.39 | 12.12 | b. In 6 ml. of 99% formic acid was dissolved 200 mg. of 1-(β-chloroethyl)-3-(2-oxoazacycloundecane-3-yl)urea at 10°C. and then a solution of 100 mg. of sodium nitrite in 1.2 ml. of water was added dropwise to the solution at 10°C. over a 3 minute period. After further stirring the mixture for 7 minutes at the same temperature as above, 40 ml. of ice water was added to the mixture and then the product was extracted 3 times each time with 10 ml. of chloroform. The extracts were combined, washed with water, dried over anhydrous sodium sulfate, and then concentrated under a reduced pressure. The oily product thus obtained was dissolved in acetone and after adding to the solution petroleum ether, the mixture was allowed to stand, whereby crystals were formed. By recovering the crystals by filtration, 180 mg. of 1-(β-chloroethyl)-3-(2-oxoazacycloundecane-3-yl)-1-nitrosourea having a melting point of 151.5°–152.5°C. was obtained.

Elemental analysis for $C_{13}H_{23}N_4O_3Cl$:

|  | C(%) | H(%) | N(%) | Cl(%) |
|---|---|---|---|---|
| Calculated: | 48.98 | 7.27 | 17.57 | 11.12 |
| Found: | 48.99 | 7.06 | 17.48 | 11.08 |

EXAMPLE 11 a. In 30 ml. of chloroform was dissolved 1.3 g. of 3-amino-2-oxoazacyclododecane and after cooling the solution to temperatures of 0°–5°C., a solution of 1 g. of β-chloroethyl isocyanate in 30 ml. of chloroform was added dropwise to the solution over a 5 minute period with stirring. Thereafter, the mixture was stirred for 1 hour at room temperature. The crystal thus formed was recovered by filtration to provide 1.8 g. of 1-(β-chloroethyl)-3-(2-oxoazacyclododecane-3-yl)urea having a melting point of 236°–237°C.

Elemental analysis for $C_{14}H_{26}N_3O_2Cl$:

|  | C(%) | H(%) | N(%) |
|---|---|---|---|
| Calculated: | 55.34 | 8.63 | 13.83 |
| Found: | 55.26 | 8.45 | 13.98 | b. In 20 ml. of 99% formic acid was dissolved 1.5 g. of 1-(β-chloroethyl)-3-(2-oxoazacyclododecane-3-yl)urea and while stirring the solution at temperatures of 0°–5°C., 1.4 g. of sodium nitrite was added to the solution over a 20 minute period. After further stirring the mixture for 15 minutes at the same temperature as above, 200 ml. of water was added to the mixture, whereby a light yellow crystals were formed. The crystal was recovered by filtration and washed with water to provide 1.24 g. of 1-(β-chloroethyl)-3-(2-oxoazacyclododecane-3-yl)-1-nitrosourea having a melting point of 138°–139°C.

Elemental analysis for $C_{14}H_{25}N_4O_3Cl$:

|  | C(%) | H(%) | N(%) |
|---|---|---|---|
| Calculated: | 50.52 | 7.57 | 16.83 |
| Found: | 50.61 | 7.53 | 16.65 |

EXAMPLE 12 a. In 30 ml. of chloroform was dissolved 1.15 g. of 3-amino-2-oxopiperidine and after adding dropwise 10 ml. of a chloroform solution containing 1.2 g. of β-chloroethyl isocyanate to the solution with stirring at 0°–5°C., the mixture was stirred overnight at room temperature. The crystals thus formed were recovered by filtration and recrystallized from methanol to provide 1.52 g. of 1-(β-chloroethyl)-3-(2-oxo-3-piperidinyl)urea having a melting point of 186°–187.5°C.

Elemental analysis for $C_8H_{14}N_3O_2Cl$:

|  | C(%) | H(%) | N(%) |
|---|---|---|---|
| Calculated: | 43.73 | 6.44 | 19.13 |
| Found: | 43.76 | 5.93 | 19.22 | b. In 40 ml. of 99% formic acid was dissolved 1.1 g. of 1-(β-chloroethyl)-3-(2-oxo-3-piperidinyl)urea and then 0.7 g. of sodium nitrite was added slowly to the solution over a thirty minute period with stirring at 0°–5°C. After further stirring the mixture for three days at 10°–13°C., 80 ml. of ice water was added to the mixture and the product was extracted 3 times each time with 40 ml. of chloroform. The extracts were combined, washed 3 times each time with water, dried over anhydrous sodium sulfate, and then chloroform was distilled away under a reduced pressure. The residue obtained was dissolved in a small amount of chloroform, a petroleum ether-acetone mixed solution (5:1 by volume ratio) was added to the chloroform solution, and the crystalline product thus formed was recovered by filtration to provide 1-(β-chloroethyl)-3-(2-oxo-3-piperidinyl)-1-nitrosourea. The filtrate was concentrated, a small amount of acetone and petroleum ether were added to the concentrate, and the system was allowed to stand forming crystals, which were recovered by filtration to provide further 1-(β-chloroethyl)-3-(2-oxo-3-piperidinyl)-1-nitrosourea. Melting point 123°–126°C.

EXAMPLE 13

In 160 ml. of 99% formic acid was dissolved 6 g. of 1-(β-chloroethyl)-3-(2-oxo-3-piperidinyl)urea and after adding slowly to the solution 2.46 g. of sodium nitrite over a 30 minute period with stirring at 7°C., the mixture was further stirred for 5 days at 5°–7°C. After the reaction was over, the reaction product was dried by freezing and the residue obtained was extracted 3 times each time with 70 ml. of chloroform. The extracts were combined, washed 3 times each time with a saturated aqueous solution of sodium chloride and once with cold water, dried over anhydrous sodium sulfate, and then the solvent was distilled away under a reduced pressure. To the residue obtained were added acetone and a small amount of petroleum ether and the crystalline product thus formed was recovered by filtration to provide 3 g. of 1-(β-chloroethyl)-3-(2-oxo-3-piperidinyl)-1-nitrosourea having a melting point of 123°–127°C.

Elementary analysis for $C_8H_{13}N_4O_3Cl$:

|  | C(%) | H(%) | N(%) |
|---|---|---|---|
| Calculated: | 38.64 | 5.27 | 22.53 |
| Found: | 38.58 | 5.31 | 22.50 |

EXAMPLE 14 a. In 20 ml. of 99% formic acid was dissolved 1.1 g. of 1-(β-chloroethyl)-3-(2-oxo-3-piperidinyl)urea and then 8 ml. of an aqueous solution containing 0.7 g. of sodium nitrite was added dropwise to the solution with stirring at 0°–5°C. After stirring further the mixture for 30 minutes, 50 ml. of water was added thereto, whereby an oily material was formed. The oily matter was extracted twice each with 10 ml. of chloroform. The extracts were combined, washed twice each time with 5 ml. of water, dried over anhydrous sodium sulfate, and the solvent was distilled away under a reduced pressure. The oily matter obtained was dissolved in a small amount of methanol and the solution was allowed to cool, whereby a crystalline product was formed. The crystals were recovered by filtration to provide 0.85 g. of 1-($\beta$-chloroethyl)-3-(2-oxo-3-piperidinyl)-3-nitrosourea having a melting point of 154°–156°C.

Elemental analysis for $C_8H_{13}N_4O_3Cl$:

| | C(%) | H(%) | N(%) |
|---|---|---|---|
| Calculated: | 38.64 | 5.27 | 22.53 |
| Found: | 38.51 | 4.88 | 22.75 | b. In 80 ml. of 99-100% formic acid was dissolved 3.5 g. of 1-($\beta$-chloroethyl)-3-(2-oxo-3-piperidinyl)-3-nitrosourea and after allowing the solution to stand for three days at 10°–13°C., 300 ml. of ice water was added to the solution, and the product was extracted 3 times each time with 70 ml. of chloroform. The chloroform extracts were combined, washed 3 times each time with water, dried over anhydrous sodium sulfate, and then chloroform was distilled away under a reduced pressure. The residue was dissolved in a small amount of chloroform, a petroleum ether-acetone mixed solution (5:1 by volume ratio) was added to the solution, and the crystalline product formed was recovered by filtration. The crystals were dissolved in chloroform, a small amount of petroleum ether was added to the solution, and the crystals thus formed were filtered off. The filtrate was concentrated and after adding acetone and a small amount of petroleum ether to the concentrate, the system was allowed to stand. The crystals thus formed were recovered by filtration to provide 1-($\beta$-chloroethyl)-3-(2-oxo-3-piperidinyl)-1-nitrosourea having a melting point of 123°–126°C.

Elemental analysis for $C_8H_{13}N_4O_3Cl$:

| | C(%) | H(%) | N(%) |
|---|---|---|---|
| Calculated: | 38.64 | 5.27 | 22.53 |
| Found: | 38.49 | 5.18 | 22.49 |

EXAMPLE 15 a. In 40 ml. of dry chloroform was dissolved 3.4 g. of 3-amino-6-methyl-2-oxopiperidine (a mixture of 1:1 cis-form and trans-form) and after adding dropwise 10 ml. of a dry chloroform solution containing 3.1 g. of $\beta$-chloroethyl isocyanate under cooling by ice water, the mixture was stirred for 2 hours. After the reaction was over, the solvent was distilled away under a reduced pressure from the reaction product and then ether was added to the residue obtained, whereby a crystalline product was formed. The crystalline product was recovered by filtration and recrystallized from acetone-benzene to provide 5.0 g. of 1-($\beta$-chloroethyl)-3-(6-methyl-2-oxo-3-piperidinyl)urea (a mixture of 1:1 cis-form and trans-form) having a melting point of 149°–151°C.

Elemental analysis for $C_9H_{16}N_3O_2Cl.1/2C_6H_6$:

| | C(%) | H(%) | N(%) | Cl(%) |
|---|---|---|---|---|
| Calculated: | 52.84 | 7.02 | 15.41 | 12.99 |
| Found: | 52.78 | 7.00 | 15.39 | 12.88 | b. In 48 ml. of 99% formic acid was added 1.2 g. of 1-($\beta$-chloroethyl)-3-(6-methyl-2-oxo-3-piperidinyl)urea and then 0.7 g. of sodium nitrite was added slowly to the solution over a 30 minute period with stirring at 0°–5°C. After stirring further the mixture for 5 days at 10°–13°C., 180 ml. of ice water was added to the mixture and the product was extracted 3 times each time with 50 ml. of chloroform. The extracts were combined, washed 3 times with water, dried over anhydrous sodium sulfate, and then chloroform was distilled away under a reduced pressure.

To the residue thus obtained were added acetone and a small amount of petroleum ether and the crystalline product thus formed was recovered by filtration and recrystallized from chloroform to provide 1-($\beta$-chloroethyl)-3-(6-methyl-2-oxo-3-piperidinyl)-1-nitrosourea having a melting point of 157°–159°C.

EXAMPLE 16 a. In 25 ml. of dehydrated chloroform was dissolved 3.8 g. of 3-amino-5-methyl-2-oxohexahydroazepine and then a solution of 3.18 g. of $\beta$-chloroethyl isocyanate in 10 ml. of dehydrated chloroform was added dropwise to the solution with stirring at 5°–10°C. After stirring the mixture for 2 hours at room temperature, the crystalline product formed was recovered by filtration to provide 2.1 g. of 1-($\beta$-chloroethyl)-3-(5-methyl-2-oxo-3-hexahydro azepinyl)urea. After washing the filtrate with water, the filtrate was dried over anhydrous sodium sulfate and the solvent was distilled away from the residue under a reduced pressure. By treating the viscous oily matter obtained with acetone and petroleum ether, 1.4 g. of 1-($\beta$-chloroethyl)-3-(5-methyl-2-oxo-3-hexahydro azepinyl)urea was further recovered. The total amount of the product was 3.5 g. Melting point 183°–184°C. (decomposed).

Elemental analysis for $C_{10}H_{18}N_3O_2Cl$:

| | C(%) | H(%) | N(%) |
|---|---|---|---|
| Calculated: | 48.49 | 7.32 | 16.96 |
| Found: | 48.42 | 7.27 | 16.59 | b. In 40 ml. of 99% formic acid was dissolved 2.9 g. of 1-($\beta$-chloroethyl)-3-(5-methyl-2-oxo-3-hexahydro azepinyl)urea and then 3.4 g. of sodium nitrite was added slowly to the solution with stirring at 5°–7°C. After further stirring the mixture for 2 hours at the same temperature as above, 250 ml. of water was added to the mixture, whereby a viscous oily matter was formed. The oily matter was extracted 3 times each time with 50 ml. of chloroform. The extracts were combined, dried over anhydrous magnesium sulate, and then chloroform was distilled away under a reduced pressure. The residue of the viscous oily matter thus obtained was dissolved in ethyl acetate, petroleum ether was added to the solution, and the crystals thus formed were recovered by filtration to provide 1.1 g. of 1-(β-chloroethyl)-3-(5-methyl-2-oxo-3-hexahydro azepinyl)-1-nitrosourea having a melting point of 118°–119°C. (decomposed).

Elemental analysis for $C_{10}H_{17}N_4O_3Cl$:

| | C(%) | H(%) | N(%) |
|---|---|---|---|
| Calculated: | 43.40 | 6.19 | 20.25 |
| Found: | 43.67 | 6.30 | 20.20 |

EXAMPLE 17 a. In 50 ml. of chloroform was dissolved 1.8 g. of 3-amino-7-methyl-2-oxohexahydroazepin and then a solution of 1.5 g. of β-chloroethyl isocyanate in 20 ml. of chloroform was added dropwise to the solution with stirring at 0°–5°C. After further stirring the mixture for 1 hour at room temperature, the product was washed twice each with 20 ml. of water, dried over anhydrous magnesium sulfate, and then the solvent was distilled away under a reduced pressure. The crystals thus formed were recovered and recrystallized from acetone to provide 1.8 g. of 1-(β-chloroethyl)-3-(7-methyl-2-oxo-3-hexahydro azepinyl)-urea having a melting point of 208°–209°C.

Elemental analysis for $C_{10}H_{18}N_3O_2Cl$:

| | C(%) | H(%) | N(%) |
|---|---|---|---|
| Calculated: | 48.49 | 7.32 | 16.96 |
| Found: | 48.28 | 7.21 | 17.10 | b. In 20 ml. of 99% formic acid was dissolved 1.7 g. of 1-(β-chloroethyl)-3-(7-methyl-2-oxo-3-hexahydro azepinyl)urea and then 2 g. of sodium nitrite was added slowly to the solution over a 30 minute period with stirring at 0°–5°C. After further stirring the mixture for 2 hours at the same temperature as above, 200 ml. of water was added, whereby a light yellow crystalline product was formed. The crystals were recovered by filtration and washed with water to provide 1.4 g. of 1-(β-chloroethyl)-3-(7-methyl-2-oxo-3-hexahydro azepinyl)-1-nitrosourea having a melting point of 133°–134°C.

Elemental analysis for $C_{10}H_{19}N_4O_3Cl$:

| | C(%) | H(%) | N(%) |
|---|---|---|---|
| Calculated: | 43.40 | 6.19 | 20.25 |
| Found: | 43.51 | 6.25 | 20.12 |

EXAMPLE 18 a. In 8 ml. of chloroform was dissolved 0.76 g. of 3-amino-8-methyl-2-oxooctahydroazocine and after adding dripwise a solution of 0.6 g. of β-chloroethyl isocyanate in 2 ml. of chloroform under cooling, the mixture was stirred for 1.5 hours at room temperature. After the reaction was over, the reaction product was concentrated under a reduced pressure. Ether was added to the concentrate thus obtained and the crystalline product was recovered by filtration to provide 0.92 g. of 1-(β-chloroethyl)-3-(8-methyl-2-oxooctahydroazocine-3-yl)urea having a melting point of 207°–210°C.

Elemental analysis for $C_{11}H_{20}N_3O_2Cl$:

| | C(%) | H(%) | N(%) |
|---|---|---|---|
| Calculated: | 50.48 | 7.70 | 16.05 |
| Found: | 50.39 | 7.83 | 16.12 | b. To 8 ml. of 99% formic acid cooled to 10°C. was added 0.258 g. of 1-(β-chloroethyl)-3-(8-methyl-2-oxooctahydroazocine-3-yl)urea and after adding dropwise a solution of 0.13 g. of sodium nitrite in 1.2 ml. of water to the mixture under cooling to 10°C., the mixture was stirred for 10 minutes at the same temperature and then cooled to 0°C. Then, 56 ml. of ice water was added to the mixture and the product was extracted with chloroform. The extract was washed with water, dried over anhydrous sodium sulfate, and concentrated under a reduced pressure at room temperature. After adding to the residue thus obtained acetone and ether, the mixture was allowed to stand. The crystals thus formed were recovered by filtration to provide 0.17 g. of 1-(-chloroethyl)-3-(8-methyl-2-oxooctahydroazocine-3-yl)-1-nitrosourea having a melting point of 129°–130°C.

Elemental analysis for $C_{11}H_{19}N_4O_3Cl$:

| | C(%) | H(%) | N(%) |
|---|---|---|---|
| Calculated: | 45.44 | 6.59 | 19.27 |
| Found: | 45.49 | 6.61 | 19.30 |

EXAMPLE 19 a. In 70 ml. of anhydrous chloroform was dissolved 2.7 g. of 3-amino-7-butyl-2-oxohexahydroazepin and after adding dropwise to the solution a solution of 2.4 g. of β-chloroethyl isocyanate in 30 ml. of chloroform with stirring at 0°–5°C., the mixture was stirred for 2 hours. Then, the reaction product was washed twice each time with 30 ml. of water and dried over anhydrous sodium sulfate. The solvent was, removed by distillation under reduced pressure and the liquid product thus obtained was subjected to silica gel column chromatography. By developing the product using a 19:1 by volume ratio of a mixed solution of ethyl acetate and methanol as an eluant, 2 g. of crystalline 1-(β-chloroethyl)-3-(7-butyl-2-oxo-3-hexahydroazepiny;)urea and 0.9 g. of paste were obtained.

The melting point of the crystal was 153°–154°C. and the Rf value of the product thus purified in a silika gel thin-film chromatography using a 9:1 by volume ratio mixed solution of ethyl acetate and methanol was 0.5.

Elemental analysis for $C_{13}H_{24}N_3O_2Cl$:

| | C(%) | H(%) | N(%) |
|---|---|---|---|
| Calculated: | 53.88 | 8.35 | 14.50 |
| Found: | 53.76 | 8.44 | 14.71 |

On the other hand, the Rf value of the paste in a silica gel thin-film chromatography using a 1:9 by volume ratio mixed solution of chloroform and ethyl acetate was 0.45.

Elemental analysis for $C_{13}H_{24}N_3O_2Cl$:

|  | C(%) | H(%) | N(%) |
|---|---|---|---|
| Calculated: | 53.88 | 8.35 | 14.50 |
| Found: | 53.69 | 8.21 | 14.31 | b-1. In 7 ml. of 99% formic acid was dissolved 0.46 g. of crystalline 1-(β-chloroethyl)-3-(7-butyl-2-oxo-3-hexahydro azepinyl)urea and then 0.43 g. of sodium nitrite was added slowly to the solution with stirring at 5°–10°C. After further stirring the mixture for 2 hours at the same temperature as above, 30 ml. of cold water was added thereto, causing a turbidity and a semi-solid material was formed. The product was extracted 3 times each time with 20 ml. of chloroform. The extracts were combined, washed twice each time with 20 ml. of water and then dried over anhydrous sodium sulfate. Then, chloroform was removed by distillation under reduced pressure and the solid product obtained was recrystallized from acetone-petroleum ether to provide 0.4 g. of crystalline of 1-(β-chloroethyl)-3-(7-butyl-2-oxo-3-hexahydro azepinyl)-1-nitrosourea having a melting point of 117°–119°C.

The Rf value of the product in a silica gel thin-film chromatography using a 1:9 by volume ratio mixed solution of chloroform and ethyl acetate was 0.75.

Elemental analysis for $C_{13}H_{23}N_4O_3Cl$:

|  | C(%) | H(%) | N(%) |
|---|---|---|---|
| Calculated: | 48.98 | 7.27 | 17.57 |
| Found: | 48.79 | 7.07 | 17.85 | b-2. In 7 ml. of 99% formic acid was dissolved 0.5 g. of 1-(β-chloroethyl)-3-(7-butyl-2-oxo-3-hexahydro azepinyl)urea and then 0.43 g. of sodium nitrite was added slowly to the solution with stirring at 5°–10°C. The product was, then, treated as in step (b-1) to provide 0.4 g. of an oily 1-(β-chloroethyl)-3-(7-butyl-2-oxo-3-hexahydro azepinyl)-1-nitrosourea.

The Rf value of the product in a silica gel thin-film chromatography using a 1:9 by volume ratio mixed solution of chloroform and ethyl acetate was 0.62.

Elemental analysis for $C_{13}H_{23}N_4O_3Cl$:

|  | C(%) | H(%) | N(%) |
|---|---|---|---|
| Calculated: | 48.98 | 7.27 | 17.57 |
| Found: | 48.73 | 7.52 | 17.61 |

EXAMPLE 20 a. In 20 ml. of anhydrous chloroform was dissolved 3.5 g. of 3-amino-5-methyl-2-oxohexahydroazepin (the picrate of the compound showed a melting point of 221°C.) and after adding dropwise to the solution a solution of 2.9 g. of β-chloroethyl isocyanate in 10 ml. of anhydrous chloroform with stirring at 5°–10°C., the mixture was stirred for 4 hours at room temperature, when a crystalline product was formed. The crystals were recovered by filtration to provide 3.7 g. of 1-(β-chloroethyl)-3-(5-methyl-2-oxo-3-hexahydro azepinyl)urea. The filtrate was washed with water, dried over anhydrous magnesium sulfate, and the solvent was removed by distillation under reduced pressure, whereby crystals were formed. The crystals were recrystallized from acetone to provide 0.8 g. of 1-(β-chloroethyl)-3-(5-methyl-2-oxo-3-hexahydro azepinyl)urea having a melting point of 182°–183°C. (decomposed). The total amount of the product obtained was 4.5 g.

Elemental analysis for $C_{10}H_{18}N_3O_2Cl$:

|  | C(%) | H(%) | N(%) |
|---|---|---|---|
| Calculated: | 48.49 | 7.32 | 16.96 |
| Found: | 48.45 | 7.30 | 16.75 | b. In 75 ml. of 99% formic acid was dissolved 4.3 g. of the 1-(β-chloroethyl)-3-(5-methyl-2-oxo-3-hexahydro azepinyl)urea prepared in the above step (a) and then 3.46 g. of sodium nitrite was added slowly to the solution with stirring at 5°–6°C. After further stirring the mixture for 4 hours at 3°–5°C., 150 ml. of water was added to the mixture, whereby an oily material was formed. The oily product was extracted 3 times each time with 50 ml. of chloroform, the extracts were combined, dried over anhydrous magnesium sulfate, and then chloroform was distilled away under a reduced pressure. The oily product thus obtained was dissolved in a small amount of ethyl acetate. Then, when petroleum ether was added to the solution and the mixture was allowed to cool in a deep freezer a light-yellow crystal was formed. On recovering the crystals product by filtration, 2.6 g. of 1-(β-chloroethyl)-3-(5-methyl-2-oxo-3-hexahydro azepinyl)-1-nitrosourea having a melting point of 118°–119°C. (decomposed) was obtained.

Elemental analysis for $C_{10}H_{17}N_4O_3Cl$:

|  | C(%) | H(%) | N(%) |
|---|---|---|---|
| Calculated: | 43.40 | 6.19 | 20.25 |
| Found: | 43.58 | 6.29 | 20.21 |

EXAMPLE 21 a. In 15 ml. of anhydrous chloroform was dissolved 2.8 g. of 3-amino-5-methyl-2-oxohexahydroazepin (the picrate of the compound showed a melting point of 165°–166°C.) and after adding dropwise to the solution a solution of 1.88 g. of β-chloroethyl isocyanate in 10 ml. of anhydrous chloroform with stirring at 5°–10°C., the mixture was stirred for 4 hours at room temperature, whereby a crystalline product was formed. The crystals were recovered by filtration to provide 3.2 g. of 1-(β-chloroethyl)-3-(5-methyl-2-oxo-3-hexahydro azepinyl)urea having a melting point of 147°–149°C.

Elemental analysis for $C_{10}H_{18}N_3O_2Cl$:

|  | C(%) | H(%) | N(%) |
|---|---|---|---|
| Calculated: | 48.49 | 7.32 | 16.96 |
| Found: | 48.51 | 7.35 | 16.78 | b. In 50 ml. of 99% formic acid was dissolved 3.0 g. of the 1-(β-chloroethyl)-3-(5-methyl-2-oxo-3-hexahydro azepinyl)urea prepared in the above step (a) and then 2.42 g. of sodium nitrite was added to the solution slowly, with stirring, at 5°–6°C. The product was treated as in Example (20-b), to provide 1.4 g. of 1-(β-chloroethyl)-3-(5-methyl-2-oxo-3-hexahydro azepinyl)-1-nitrosourea having a melting point of 111°–112°C. (decomposed).

Elemental analysis for $C_{10}H_{17}N_4O_3Cl$:

|  | C(%) | H(%) | N(%) |
|---|---|---|---|
| Calculated: | 43.40 | 6.19 | 20.25 |
| Found: | 43.49 | 6.25 | 21.98 |

EXAMPLE 22 a. In 45 ml. of anhydrous chloroform was dissolved 4 g. of 3-amino-5-cyclohexyl-2-oxohexahydroazepin and then while stirring the solution under cooling, a solution of 2.5 g. of β-chloroethyl isocyanate in 10 ml. of anhydrous chloroform was added dropwise to the solution, and thereafter the mixture was stirred for 3 hours at room temperature. The crystals formed were recovered by filtration to provide 1.5 g. of 1-(β-chloroethyl)-3-(5-cyclohexyl-2-oxo-3-azepinyl)urea. The filtrate was washed with water, dried over anhydrous magnesium sulfate, and then the solvent was removed by distillation under reduced pressure. By recrystallizing the residue obtained in acetone, 1.7 g. of 1-(β-chloroethyl)-3-(5-cyclohexyl-2-oxo-3-hexahydro azepinyl)urea was also obtained. The total amount of the product was 3.2 g. Melting point 195°C. (decomposed).

Elemental analysis for $C_{15}H_{26}N_3O_2Cl$:

|  | C(%) | H(%) | N(%) |
|---|---|---|---|
| Calculated: | 57.04 | 8.30 | 13.30 |
| Found: | 57.12 | 8.27 | 13.32 | b. In 30 ml. of 99% formic acid was dissolved 1.55 g. of 1-(β-chloroethyl)-3-(5-cyclohexyl-2-oxo-3-hexahydro azepinyl)urea and then 1.02 g. of sodium nitrite was added slowly to the solution with stirring at 5°–6°C. After further stirring the mixture for 4 hours at 0°–5°C., 60 ml. of water was added, whereby a viscous resinous material was formed. The product was extracted 3 times each time with 30 ml. of chloroform. The extracts were combined, washed with water, and dried over anhydrous magnesium sulfate. By distilling away the solvent under a reduced pressure and treating the sirupy product with a small amount of ether, 1.12 g. of 1-(β-chloroethyl)-3-(5-cyclohexyl-2-oxo-3-hexahydro azepinyl)-1-nitrosourea was obtained.

Melting point 134°C. (decomposed).

Elemental analysis for $C_{15}H_{25}N_4O_3Cl$:

|  | C(%) | H(%) | N(%) |
|---|---|---|---|
| Calculated: | 52.25 | 7.31 | 16.25 |
| Found: | 52.21 | 7.33 | 16.23 |

EXAMPLE 23 a. In 70 ml. of anhydrous chloroform was dissolved 2.7 g. of 3-amino-5-methoxy-2-oxohexahydroazepin and after adding dropwise to the solution a solution of 2.4 g. of β-chloroethyl isocyanate in 30 ml. of anhydrous chloroform, the mixture was stirred for 30 minutes, whereby the solution began to become turbid and a crystalline product was formed. After stirring the system for further 2 hours, the crystals were recovered by filtration and washed with 10 ml. of chloroform and then 10 ml. of ether to provide 3.3 g. of 1-(β-chloroethyl)-3-(5-methoxy-2-oxo-3-hexahydro azepinyl)urea having a melting point of 188°–189°C.

Elemental analysis for $C_{10}H_{18}N_3O_3Cl$:

|  | C(%) | H(%) | N(%) |
|---|---|---|---|
| Calculated | 45.54 | 6.88 | 15.93 |
| Found: | 45.72 | 6.71 | 15.79 | b. In 50 ml. of 99% formic acid was dissolved 3.3 g. of 1-(β-chloroethyl)-3-(5-methoxy-2-oxo-3-hexahydro azepinyl)urea and while stirring the solution at 4°–8°C., 3.5 g. of sodium nitrite was added slowly to the solution over a 1 hour period. After further stirring the mixture for 1 hour, 260 ml. of cold water was added to the reaction product and the product was extracted 3 times each time with 70 ml. of chloroform. The extracts were combined, washed 3 times each time with 100 ml. of water, washed further with an aqueous saturated solution of sodium chloride, and then dried over anhydrous sodium sulfate. By distilling off chloroform from the product under reduced pressure, 3.5 g. of a viscous residue was obtained. The viscous residue obtained was subjected to a silica gel column chromatography and developed using a 1:1 by volume ratio mixed solution of ethyl acetate and chloroform as an eluant to provide 2 g. of the crystal of 1-(β-chloroethyl)-3-(5-methoxy-2-oxo-3-hexahydro azepinyl)-1-nitrosourea having a melting point of 131°–132°C.

Elemental analysis for $C_{10}H_{17}N_4O_4Cl$:

|  | C(%) | H(%) | N(%) |
|---|---|---|---|
| Calculated: | 41.03 | 5.85 | 19.14 |
| Found: | 40.92 | 5.59 | 19.28 |

EXAMPLE 24

In 72 ml. of dichloromethane and 36 ml. of 99% formic acid was dissolved 4.2 g. of D-1-(β-chloroethyl)-3-(2-oxo-3-hexahydro azepinyl)-urea and while stirring the solution at temperatures of −5°C. to 0°C., a solution of 1.6 g. of sodium nitrite in 5 ml. of water was added dropwise to the solution. The mixture was further stirred for 2.5 hours and then 100 ml. of water was added thereto. A dichloromethane layer thus formed was recovered and the aqueous layer was extracted twice each time with 60 ml. of dichloromethane and the extracts were combined with the dichloromethane layer recovered above.

The dichloromethane solution thus recovered was washed 3 times each time with 50 ml. of water, dried over anhydrous magensium sulfate, and then the solvent was distilled off under reduced pressure. The oily product thus obtained was dissolved in 20 ml. of ethanol and after adding thereto 100 ml. of petroleum ether, the mixture was allowed to stand at 4°C. The crystal product formed was recovered by filtration to provide 3.8 g. of D-1-($\beta$-chloroethyl)-3-(2-oxo-3-hexahydro azepinyl)-1-nitrosourea having a melting point of 92.5°–93.5°C.

$[\alpha]_D^{25} = -69°$ (C = 2, ethanol)

Examples of preparing medicaments:

Capsule

| | |
|---|---|
| DL-1-($\beta$-chloroethyl-3-(2-oxo-3-hexahydro-azepinyl)-1-nitrosourea | 15 |
| Lactose | 150 |
| Starch | 30 |
| Talc | 5 |

The above components were mixed and filled in No. 3 capsules with 200 mg. per each capsule.

Tablet

| | |
|---|---|
| DL-1-($\beta$-chloroethyl)-3-(2-oxo-3-hexahydro-azepinyl)-1-nitrosourea | 15 |
| Crystalline cellulose | 60 |
| Lactose | 50 |
| Starch | 20 |
| Magnesium stearate | 5 |

The above components were mixed, granulated by a conventional manner, and formed into tables each having a diamter of 7.5 mm. and weight of 200 mg.

Injection

In one liter of distilled water for injection were dissolved 1 g. of DL-1-($\beta$-chloroethyl)-3-(2-oxo-3-hexahydro azepinyl)-1-nitrosourea, 20 g. of ethanol, and 0.1 g. of acetic acid and the solution prepared was aseptically divided by 10 ml into 100 ampules.

What is claimed is:

1. DL-1-($\beta$-chloroethyl)-3-(2-oxo-3-hexahydro azepinyl)-1-nitroso urea.

* * * * *